March 7, 1944. W. A. EDSON 2,343,539
STABILIZED OSCILLATOR
Filed Jan. 16, 1942 3 Sheets-Sheet 1

INVENTOR
W. A. EDSON
BY
ATTORNEY

March 7, 1944.    W. A. EDSON    2,343,539
STABILIZED OSCILLATOR
Filed Jan. 16, 1942    3 Sheets-Sheet 2

INVENTOR
W. A. EDSON
BY
Guy T. Morris
ATTORNEY

March 7, 1944. W. A. EDSON 2,343,539
STABILIZED OSCILLATOR
Filed Jan. 16, 1942  3 Sheets-Sheet 3

INVENTOR
W. A. EDSON
BY
ATTORNEY

Patented Mar. 7, 1944

2,343,539

UNITED STATES PATENT OFFICE 2,343,539

STABILIZED OSCILLATOR

William A. Edson, Chicago, Ill., assignor to Bell Telephone Laboratories, Incorporated, New York, N. Y., a corporation of New York Application January 16, 1942, Serial No. 427,031

4 Claims. (Cl. 250—36)

This invention relates to oscillators which are stable as to frequency, frequency stability being conceived broadly as inconsistent with the presence of certain phenomena that commonly attend the generation of electric waves by practicable means and result in waves which are other than continuous sinusoidal waves.

These phenomena include low frequency disturbances, sometimes expressed as interruptions of the prime wave and sometimes as a fairly regular low frequency modulation of such prime wave. These and other effects contemplated occur in all feedback oscillators, to which class of oscillators the invention pertains, but some tend to be induced more particularly, or at least to a greater extent, in specific forms of feedback oscillators and particularly in oscillators wherein there is a physical separation of the elements which contribute the gain and amplitude limitation functions, although the basic principles of the invention are not so limited and the invention as expressed in other species is adapted to a circuit which does not satisfy this condition.

It is an object of the invention to reorganize the circuits of old types of oscillators, so as to eliminate the low frequency disturbances that attend their normal operation. By the method of analysis here presented, it is possible to determine the conditions for such disturbances and the type of reorganization necessary for eliminating them. The eliminating means, and therefore the solution of the problem imposed, affects an auxiliary feedback circuit for gain or volume control. More specifically, the conventional feedback for that purpose, involving a means for rectifying a portion of the oscillator output wave and a means for utilizing the resultant product to condition the operation of the circuit element which performs the gain function, has been reorganized and elaborated for the purposes of the invention and therefore with reference to the tendency for the development of such low frequency disturbances, while being inherently ineffective to modify the normal generation of the prime (carrier) wave. The analysis which induced the conception of the invention in its various specific forms results in a rather general and simple concept of oscillator performance.

Another object is to utilize the teachings of the above analysis to achieve the intentional generation of a modulated wave by control of the low frequency behavior of an oscillator as above commented on. The result is a stable frequency self-modulated oscillator in which the carrier and modulation frequency may be varied independently and the corresponding amplitude levels and percentage modulation may be similarly controlled.

The invention may be better understood with reference to the accompanying drawings in which.

Preliminary to a description of the invention as expressed in its various specific forms, a consideration will be given of the basic analysis and reasoning leading to an understanding of the invention and a prediction as to its operational characteristics. For this purpose, a type of oscillator circuit will be chosen which will make possible the most simple and effective treatment of the analysis, this circuit being also the basic circuit of one species of the invention and therefore a circuit to which the improvement of the invention is applied. The analysis is applicable by a logical extension of reasoning, or by analogous reasoning, to the other species of the invention and to oscillation generating circuits generally.

Consideration of oscillator circuits in general indicate that only three basic functions are performed in the generation of oscillations, this suggesting the corresponding use of three functional elements although, as will be apparent later, certain of these functions may be combined in a single element. This is true of all oscillators but the specific analysis herein contemplates that a feedback oscillator be used.

Figure 3:
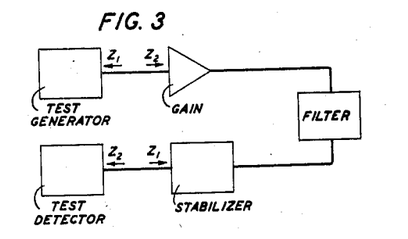

First, gain must be provided in order to overcome circuit losses and to supply a useful load. Second, a device producing a change of phase shift with change of frequency is necessary in order to insure frequency stability. In general the rate of change of phase with respect to frequency at the operating frequency is a direct measure of the frequency stability. This device partakes of the nature of a tuned circuit and is the frequency determining circuit in the usual instance. More broadly conceived, it is a filter and it will be so denominated in this specification. In a feedback oscillator comprising an electronic gain element or device, which produces a phase shift, there must be a compensatory phase shift elsewhere in the circuit in order that the fed back oscillations may be caused to perpetuate themselves. Sometimes the tuned circuit or filter performs this function. In pursuance of its frequency determining or stabilizing function, it is necessary that the rate of change of phase of the current passing through it be large for a given change of frequency. Thirdly, an amplitude-limiting device is necessary. This function is frequently performed by the electron tube used as the gain device, but in some useful forms of oscillation generating circuits it is separate therefrom, and a circuit in which it is separate, and in fact in which all three elements are separate from each other, lends itself more easily to the present analysis. This limiter is necessary since all useful oscillators show considerable excess gain and the excess must be accounted for by the limiter in order that a finite constant output shall be achieved. For high amplitude stability the rate of change of loss with respect to level should be large at the operating level. The well-known Hartley oscillator illustrates an instance in which the vacuum tube combines the functions of gain and limiter. In the Meacham bridge oscillator of Patent 2,163,403, June 20, 1939, the functions of limiter and filter are both performed by the bridge. In Fig. 3 of Caruthers 2,066,333, January 5, 1937, all three elements are separate, the bridge performing the limiter function only. A practical advantage of the separation of the gain and limiter functions is to make possible the beneficial use of a linear gain element. It is convenient in the present analysis to assume such linear gain element which, because of its linearity requires no special treatment here so that the discussion will be confined to the performance of limiters and filter elements.

It is well known that oscillators of all kinds tend to suffer from low-frequency disturbances, that is, the output is modulated in amplitude at a frequency low compared with the normal output frequency. Although sometimes modulation is of relatively small amplitude and nearly sinusoidal, usually it is so violent as to cause complete cessation of oscillations for a large portion of the time. This phenomenon is likely to have its origin in the limiter. It should be recognized that there are various types of limiters such as, (1) thermistors, which change their resistance with the current flowing through them by thermal action, including carbon and tungsten lamps, (2) varistors, which change their impedance with change in the instantaneous current flowing through them, including copper-oxide and thyrite elements and certain electronic diodes, (3) vacuum tubes or other electronic devices which reduce their gain by simple overloads or increase of current through them as in the above Hartley oscillator, and (4) vacuum tubes or the like which reduce their gain with application of a bias developed as a result of the oscillation, wherein, usually, part of the output is rectified and returned as bias potential. In general, the devices of the first and last of these four classes are capable of functioning without appreciable harmonic production, in the instance of the thermistors because of the thermal lag, which tends to make them immune to effects occurring within the cycle time of the frequency concerned. The devices of these two classes are therefore known as linear elements, and those of the other two classes as non-linear elements. Although, as above indicated low frequency disturbances tend to affect oscillators of all sorts, oscillators using thermal limiters, as in the Meacham bridge oscillator, that has been mentioned and to which applicant's invention in one species is applicable, are particularly subject to low frequency phenomena of this kind. The reason for this is, in a general way as follows. When the circuit is first energized the lamps (thermal limiters) are cold and the loop gain high. Oscillations build up to a large value before the lamps can heat up and a large amount of energy is stored in the oscillatory circuit. In a fraction of a second the lamps heat up but, because of the stored energy, they are carried not to the balance value but to a resistance so high as to cut off the oscillation. If the oscillation dies out before the lamps cool to a value permitting it to rise again the cycle will repeat indefinitely.

The basic analysis, as applied in various ways in a great variety of oscillators, was developed in connection with a lamp stabilized oscillator, that is an oscillator using a lamp or lamps as the thermal limiter element, because the principle is most easily applied to it and other types of linear oscillators. Although applicable to most other forms of oscillators, the interpretation of the results as applied thereto may be difficult in some instances although a knowledge merely of the nature of the problem is often quite useful.

Figure 1:
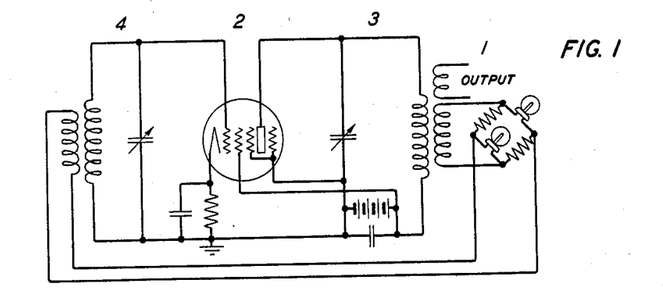
Fig. 1 discloses a thermally limited oscillator of the prior art, here used to illustrate the development of the analysis which eventually led up to the novel circuits disclosed in later numbered figures.

The prototype oscillator for which the method to be outlined below was developed is shown in Fig. 1. This circuit is of the Meacham bridge type, as disclosed in the above Meacham Patent 2,163,403, June 20, 1939, except that in order to promote amplitude stability with changes in ambient temperature although with a certain sacrifice of corresponding frequency stability, the filter element is separated from the stabilizer or limiter element. To this extent the circuit more nearly resembles Fig. 3 of Caruthers 2,066,333, January 5, 1937, also above mentioned. The stabilizer or limiter 1 is a bridge comprising resistance elements and thermistors, in this instance tungsten lamps. This stabilizer is in the feedback circuit of the amplifier or gain device 2 with tuned circuits 3 and 4 separating the feedback circuit proper from the output and input circuits, respectively of said amplifier and together constituting what is denominated the filter in the present analysis. In view of the simplicity of the circuit and the limited occasion for reference to collateral features of the circuit, further description and use of reference labels is dispensed with.

Figure 2:
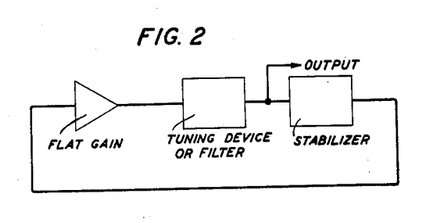
Figs. 2 and 3 are block diagrams illustrating, for purposes of analysis, the circuit of Fig. 1.

In Fig. 2, the circuit is reduced to an equivalent block diagram in terms of the three functions previously discussed and identified in the Fig. 1 schematic. In view of the functional labeling of the three corresponding elements, further labeling or description is believed to be unnecessary. In Fig. 3, the oscillating loop is opened and a generator and detector are supplied. The impedances, which are not shown separately but are indicated by reference symbols $Z_1$ and $Z_2$, are assumed to be such, and as indicated by the directions of the arrows and the choices of symbols, as to avoid disturbing the normal operation of the Figs. 1 and 2 circuit except as affected by the change of condition intended to be indicated by this figure, and therefore so that each end of the circuit sees exactly the same impedance as it normally does. The circuit may be tested in precisely this way although for present purposes the expedient is used only to help in visualizing the operation of the circuit and in the teaching of the analytical principle used. As in Fig. 2, the functional labeling obviates the necessity of other labeling except as to the above impedance labeling. The correspondence of the elements to those in Figs. 1 and 2 is obvious. If the output and frequency of the test generator are adjusted to appropriate values, other elements of the loop being left undisturbed, it will be found that the terminal voltage of the detector is identical in value and phase with that of the generator. This is obviously the desired oscillation condition. The stability of this condition is now to be determined.

If the above setting of the test generator is maintained but in addition an incremental amplitude-modulation of low frequency is applied, we have the desired test condition. It is of the essence of the analytical method, differing from prior analyses of the same generic type, that the transmission of the envelope of this modulation may be treated as is the transmission of a simple frequency in standard feedback theory. Thus, if the envelope is transmitted from generator to detector without phase shift and without loss or with net gain, it may be expected that the oscillator will be unstable. Under these conditions when the loop is closed the high frequency will be produced with a low frequency modulation in the vicinity of that frequency for which the envelope phase shift has just been found to be zero. This would indicate the existence of the low frequency phenomenon which it is the purpose of this invention to study, predict, and, if desired, to use beneficially.

In the analysis use will be made of the very well-known polar $\mu\beta$ diagram, expressing in polar coordinates the relation between the amplitude and phase of a given wave transmitted through a given path. Although a "$\mu\beta$" diagram has been referred to, a like diagram is applicable to a $\mu$-path or a $\beta$-path alone. Of course the $\mu$-path refers to a path in which a gain occurs, as that through the gain element, and the $\beta$-path refers to a path in which there is a loss, as in the feedback path of a conventional oscillator, the $\mu\beta$-path referring to the complete loop. Good examples of $\mu\beta$ diagrams are contained in the patents to Nyquist 1,915,440, June 27, 1933, and Black 2,102,671, December 21, 1937, although given a more fundamental treatment in the Black paper published in the Proceedings of the Institute of Radio Engineers for October, 1934, and in the Nyquist paper referred to in several places in said Black patent. Since the Meacham circuit treated in the present specification resembles quite closely that of his Patent 2,275,452, issued March 10, 1942, it may be of interest to note that Figs. 2 and 3 thereof comprise $\mu\beta$ diagrams representing the analysis of the circuit in question, although treating a different problem than is treated in the present application and leading to a different solution. Having in mind the present considered type of instability and the $\mu\beta$ diagram expressing it, the accurate statement of the criterion of instability is that instability will result if the envelope transmission loops the point (1,0) exactly as in amplifier and feedback oscillator theory generally.

In a manner of speaking the desired oscillation, that is, the frequency on which the undesired modulations are imposed, may be regarded as a passive element in the test of low frequency behavior, its presence being necessary to bring the stabilizer or limiter to its normal operating point. In particular the flat gain unit of the block diagram produces no change in the shape of the high frequency modulated wave and accordingly it must be considered as a straight through circuit affecting the envelope neither as to loss, gain or phase. Therefore, the filter and stabilizer must be the significant elements and these will now be considered separately.

Figure 4:
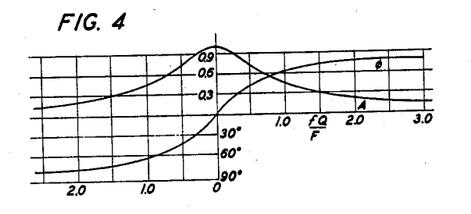
Figs. 4 to 8 comprise analytical curves illustrating the performance characteristics of the circuit of Fig. 1.

The block designated "tuning device or filter" in Fig. 2, is essentially a band-pass filter. In practice it usually amounts only to one or two tuned circuits and is shown as comprising two tuned circuits in Fig. 1. Fig. 4 illustrates typically, the transmission and phase characteristics of a single tuned circuit. In this figure the ordinates are the phase ($\Phi$) and the relative amplitude (A) of a sinusoidal wave as plotted against a function of the deviation $f$ from resonance frequency F in terms of the relative value of the two frequencies. Here Q is the familiar ratio of reactance to resistance of a tuned circuit, closely equal to $\omega L/R$. The function of the deviation frequency $f$ is plotted as a ratio in order to make the curve independent of the Q and resonance frequency F of a particular circuit. Maximum transmission occurs at the resonance frequency F, that is, when $f=0$. In any circuit where Q exceeds about 25 as here assumed, the phase shift is 45° and the transmission $$\frac{1}{\sqrt{2}}$$

of maximum where the frequency deviation ratio is $$\frac{1}{2Q}$$

That is, as shown, $\Phi=45°$ for $$f/F = \frac{1}{2Q} \text{ or } \frac{fQ}{F} = \frac{1}{2}$$

or $f=F/2Q$. Thus the behavior of any circuit may be plotted from this general curve by transforming the abscissa from ratios to cycles.

The transmission of a modulated wave through such a filter is easily computed by separating the wave into carrier and two side-bands. Clearly the difference between carrier and either sideband is equal to the modulation frequency $f$, that is, it is equal to the frequency deviation $f$ of Fig. 4. If $f=F/2Q$ each side-band is dropped to $$\frac{1}{\sqrt{2}}$$

of its input value and the phase of each is shifted 45°. Thus the envelope falls to $$\frac{1}{\sqrt{2}}$$

of its input value and its phase is shifted 45°. The sign of the phase is that of the upper side-band.

In polar form the transmission of a single section filter is a semicircle. Where $f=0$ the transmission is unity, the phase 0°. Where $f=F/2Q$ the transmission is $$\frac{1}{\sqrt{2}}$$

at 45° lagging phase. Where $f$ is large the transmission approaches zero at 90° lagging phase.

Figure 5:
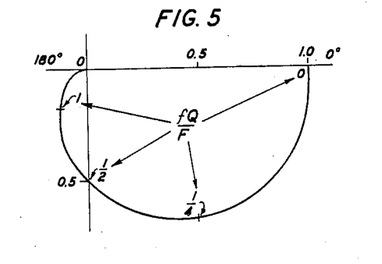

Fig. 5 is the polar plot of the transmission of two such circuits. Here for $f=F/2Q$, that is, for $$\frac{fQ}{F} = \frac{1}{2}$$

in terms of the frequency scale of Figs. 4 and 5, $$\text{transmission} = \frac{1}{\sqrt{2}} \cdot \frac{1}{\sqrt{2}} = \frac{1}{2}$$

and $\Phi = 45° + 45° = 90°$. For large values of $f$ the phase approaches 180°.

Since the amplifier and stabilizer taken together have substantially no phase shift except the inherent 180-degree phase shift of the amplifier and since the requisite additional 180-degree phase shift is achieved by the transformers, or either of them, the normal oscillation must occur substantially at the point of zero phase shift of the filter. It is significant that this filter can produce an increase in modulation only in the improbable case of oscillation at a frequency other than that of maximum transmission. Since it is believed that that case is of no practical interest, decrease of modulation may always be expected in such a device so that the device may be thought of as a $\beta$-path.

Figure 6:
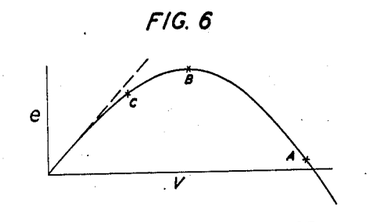

The operation of the stabilizer element is much less familiar than is that of the filter. Fig. 6 illustrates the direct current characteristic of a bridge network as shown in Fig. 1, plotted between the impressed potential V and the potential $e$ derived from the alternate vertices of the bridge and fed back to the input of the gain element. At high frequencies, that is at frequencies above about 1 kilocycle, the characteristic is virtually identical with the direct current characteristic because the thermal-resistance characteristics are unable to follow the high frequency cycle. We wish to evaluate the effect of applying a low frequency modulation of infinitesimal magnitude to such a high frequency wave. Three possible operating points for the bridge are designated A, B and C for convenience in reference. The operating point is determined by the voltage of the high frequency wave which in turn is determined by the gain of the amplifier. Evidently one analysis must be made for that voltage which makes the bridge loss equal to the amplifier gain less the filter loss.

One point of the envelope frequency-transmission characteristic may be evaluated immediately. That is for a high modulating frequency, say of the order of half of the carrier frequency, the wave is transmitted without any distortion just like a simple high frequency wave. Therefore the modulation is unchanged with relation to the carrier so that the envelope transmission is unity. This is true for any operating point of the bridge. Another point is obtained by allowing the modulating frequency to approach zero and here the envelope change can be obtained by evaluating the slope of the direct current characteristic of Fig. 6, since the slope is a measure of the dependence of the output on the input. Use is made of this direct current characteristic, in this instance, where it could not be used in the previous instance because at the low envelope frequency concerned the thermal leg is such that the thermal-resistance characteristics are able to follow this low frequency cycle.

For operating point B, corresponding to the maximum output, the slope is zero so that the output is independent of input and therefore the envelope transmission is zero. For point C the envelope is transmitted without reversal of phase but since the slope is less than that of the straight line, the transmission is attended by some loss. For point A, a more desirable operating point, the envelope is reversed in phase since the slope is reversed and there is a considerable increase in magnitude since a small percentage change of input results in a large percentage change of output.

For a fairly high modulating frequency (perhaps 100 cycles) the lamps are able to change their resistance by only a small amount during each modulation cycle. Moreover, the lamps will reach maximum resistance when the modulation is approaching its zero after going through a maximum. Therefore, the attenuation of the bridge changes only a small amount during the cycle but lags the applied voltage by nearly 90°. Accordingly, a small component will be added to the output in a 90° leading position.

We now know that the transmission for zero modulating frequency is on the real axis and that its value depends on the operating point on the curve of Fig. 6 such as A, B, or C. We also know that as the modulating frequency approaches a high value the transmission approaches 1.0 at right angles to the real axis.

Figure 7:
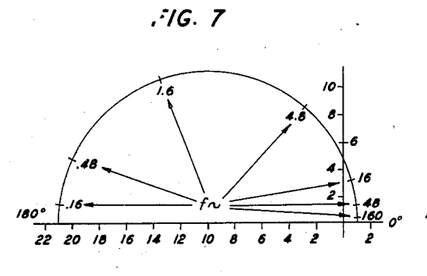

We know that simple electrical networks which have the transmission points just defined describe a semi-circle in traversing the frequency range from low to high. Such a semicircle is shown in Fig. 7 for a particular operating point near A for a particular bridge. The argument here presented is verified by the fact that a semicircular locus has been observed experimentally for a thermistor bridge similar to this one. In this Fig. 7, the modulation, that is the envelope, frequency points are indicated by the quantities opposite the arrows. The vector values are in terms of the ratio of side-band transmission to carrier transmission, this being ordinarily thought of as a measure of envelope transmission. It is important to observe that the percentage modulation of a low frequency test wave may be greatly increased in the lamp bridge. In fact it is the zero frequency extrapolation of this behavior which gives us negative feedback and output stabilization in the Meacham bridge oscillator. It is also this increase or gain in this envelope which causes trouble. The amplifier, an active circuit, has no effect on the envelope. The filter normally attenuates the envelope and we have the paradox of a passive dissipative circuit, the lamp bridge, producing all the gain in the system. This anomalous behavior is the key to the entire situation. In view of this consideration, the stabilizer has to be treated as a gain portion of circuit, hence it is proper to think of the diagram as a $\mu$ diagram.

Figure 8:
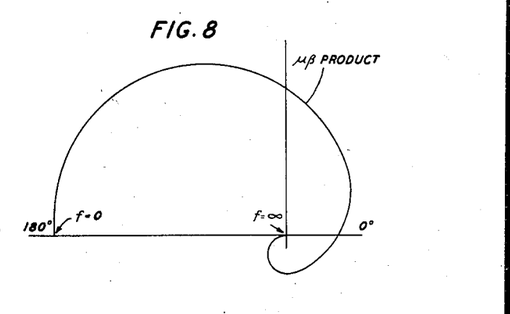

In Fig. 8, the vectorial product $\mu\beta$ is plotted, this diagram therefore representing the vectorial product of the values for the diagrams of Figs. 5 and 7. That is, for each particular modulation frequency $f$ the vectors of Fig. 5 and Fig. 7 for that frequency are multiplied to obtain a point on Fig. 8. This diagram is the end product of the method of analysis and, depending on the precise dimensions of the diagram, which itself depends on the particular electrical values used, it should be possible to predict the stability or instability with reference to extraneous frequencies, of the given Fig. 1 circuit. In particular, if the locus loops the (1,0) point, a condition of instability is indicated.

Suppose in Fig. 5 that $Q=100$ and $F=3200$ cycles so that $$\frac{Q}{F}=\frac{1}{32}$$

The four indicated points are $$\frac{fQ}{F}=0, \tfrac{1}{4}, \tfrac{1}{2}, 1$$

or $f=0, 8, 16, 32$ cycles. Now for $f=16$ cycles we have, from Fig. 7, $$\mu=3 \angle 80°$$

(that is, with radius vector 3 at an angle of 80°) and, from Fig. 5, $$\beta=0.5 \angle -90°$$

so $$\mu\beta=1.5 \angle -10°$$

At 8 cycles $$\mu \doteq 5 \angle 90°$$
$$\beta \doteq 0.7 \angle -55°$$

so $$\mu\beta=3.5 \angle 35°$$

Clearly $\mu\beta$ loops the point 1,0 and modulation will result.

Alternatively suppose that $Q=100$ and $F=100,000$ so that $$\frac{Q}{F}=\frac{1}{1000}$$

The frequencies for the indicated points of Fig. 5 are now $f=0, 250, 500, 1000$ cycles. For all these frequencies $\mu$ from Fig. 7 is almost identically unity. Likewise for frequencies up to 100 cycles $\beta$ of Fig. 5 is virtually unity. The resulting plot for $\mu\beta$ corresponding to Fig. 8 does not enclose 1,0 but does come very near to cutting that point.

As a third case let $Q=40,000$ and $F=4,000$, a situation that might exist with quartz resonators. The values of $f$ in Fig. 5 are now 0, $\tfrac{1}{40}$, $\tfrac{1}{20}$ and $\tfrac{1}{10}$ cycles. For this range of $f$ the $\mu$ of Fig. 7 is essentially constant at $$21 \angle -180°$$

Fig. 8 must then look essentially like a reversal of Fig. 5. For this third case a very real margin separates the loop from 1,0.

In general if the two resonant circuits have different values of Q the loop of Fig. 5 will be less open and it will be easier to obtain margin in Fig. 8. This is analogous to controlling the cut-off in feedback amplifiers, a well-known art.

The analysis so far has been with reference to a particular circuit in which there is a complete physical separation of the elements having the various functions pointed out near the beginning of the specification as inherent in any feedback oscillator. The treatment has been at some length partly because the choice of the circuit lends itself well to the elaboration of the analytical treatment and partly because the treatment with rather obvious variations is applicable quite generally so that the treatment in this place would tend to obviate the necessity of a similar treatment for other types of oscillators that would become of significance later. Also the particular circuit chosen is to be used later to illustrate a specific application of the invention. Since another specific application of the invention is with reference to a distinctively different type of basic oscillator circuit, a treatment in brief of such circuit will be introduced at this point. After that consideration will be given to the specific circuits of the invention.

Figure 9:
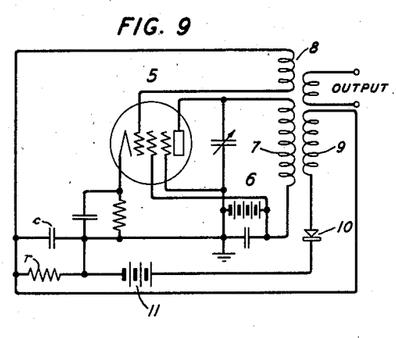
Fig. 9 illustrates, comparably with Fig. 1, a second old circuit as a preliminary to an analysis thereof similarly as in the instance of said Fig. 1.

Fig. 9 illustrates, rather schematically, a very simple oscillator having amplitude limitation as achieved by a grid bias control. This is the last mentioned of the four types of limiters listed early in this specification. From its similarity to a familiar radio circuit it is often denominated as the automatic-volume-control (a-v-c) oscillator. In it the functions of gain and stabilization or limitation are performed in a single element, namely, in vacuum tube or the like 5. Said tube 5, with the frequency determining circuit 6 corresponding to the "filter" in the circuit above treated, and the feedback from its coil 7 to the coupling coil 8, provides a conventional tuned output feedback oscillator. The stabilization because of the necessary amplitude limitation is achieved by a second feedback path involving the coil 9, likewise coupled to said coil 7 by which a desired amount of energy is taken off to be rectified by rectifier 10 and impressed on the grid or control electrode of the tube 5 through a circuit traced through biasing battery 11, the $rc$ network comprising the resistance $r$ and capacitance $c$ and the feedback coil 8. It is evident that the potential across resistance $r$ is a function of the output amplitude so that it makes possible a variation of the control electrode potential which reflects a potential thereacross in such a way as not only to initially limit the amplitude which otherwise tend progressively to get indefinitely higher with each cycle of energy fed back, but also tends to control the volume as affected by extraneous phenomena reflected in a change of output potential. The capacitance $c$ in general functions to by-pass all alternating potentials at that point and therefore insure that the potential impressed on the control electrode from the resistance $r$ is steady, although the operation considerably depends on the time constant of the $rc$ circuit as affected by the relative values of the resistance and capacitance. The biasing source 11 determines a threshold value of output potential under which the stabilization or gain control does not function. Also by its use a larger change in the voltage across $r$ for a decibel change in the oscillating level is achieved. Therefore, a larger change in tube or circuit gain may be tolerated without unduly affecting the output level. That is doubling the number of turns on coil 9 and at the same time doubling the voltage of battery 11 will not affect the threshold at which voltage begins to appear across $r$ but will double the voltage across $r$ produced by a small fractional rise above this threshold level.

It would be quite appropriate to include here block diagrams applicable to Fig. 9 and analogous to Figs. 6 and 7 and follow through a similar analysis. However, in view of what has gone before, such figures and specific treatment may be dispensed with to advantage and the treatment correspondingly greatly abbreviated.

The behavior of the filter section, that is the tuned circuit, has already been discussed in connection with the preceding circuit. The new feature is the behavior of the amplifier 5 as affected by the gain adjuster elements 10, 11, $r$ and $c$. For any reasonable frequency, the gain of the amplifier is a direct function of the bias voltage, without phase or time delay. Accordingly, it is necessary only to evaluate the behavior of the rectifier 10 to a modulated wave and this is the familiar problem of the radio detector. As the modulation frequency varies from low to high the corresponding diminution of energy of the wave of modulation frequency resulting from detection of the modulated wave varies from zero to infinity and the phase changes from 0 to 90 degrees. This phenomenon is well known in the art, a treatment of it at least to some extent being included in Bode 2,123,178, July 12, 1938. Applying these considerations to the transmission of the modulated wave, a $\mu$ diagram for the envelope transmission of the modulated wave through the controlled amplifier may be obtained. Such a diagram is not separately included because it eventuates that the characteristic is identical with the corresponding diagram for the lamp bridge as disclosed in Fig. 7.

In this case the filter consists of only one tuned circuit. Accordingly the $\beta$ diagram applicable is a semicircle from 1,0 to 0,0 and approaching 0 at —90°. Therefore the total $\mu\beta$ diagram although generally similar to Fig. 8 lies only in three rather than four quadrants. Therefore, the risk of looping 1,0 is markedly decreased.

One important difference between the operational characteristics of the two circuits is in favor of the bias stabilizing system. That is, the time constants of the lamp stabilizer can be chosen only over very narrow limits, while correspondingly, that for the physical $rc$ circuit of Fig. 9 may be varied at will between rather wide limits. Also with the bias system no large high frequency gain need exist, although effective gain somewhere in the loop is necessary to obtain a large change in bias with small change of level. In the lamp stabilized oscillator, the bridge loss must be compensated directly by high frequency gain. However, the lamp circuit requires fewer electrical elements than the bias stabilized system.

The development of a simple bias-controlled oscillator will now be explained to clarify the material already given and to illustrate certain ideas not yet presented. The prototype circuit will be that of Fig. 9 to which certain elements will be added to enable the circuit to avoid the tendency of the circuit to be unstable with respect to the low frequency modulating currents inherently set up in the operation of the oscillator. It is obvious from the above analysis that attention may be confined entirely to the gain adjuster element and its appurtenances, that is the oscillator proper will be unaffected.

It is evident that the gain adjuster must satisfy two fundamental conditions. It must deliver a direct current bias that increases rapidly with increase of level of operation and it must attenuate to a high degree any current of oscillation frequency which may enter it. The use of a balanced or push-pull rectifier contributes largely to the latter without seriously affecting the former. Its use is therefore indicated. A constant counter electromotive force or back bias is conducive to the former as has been explained, and does not affect the latter. It will also be used. The use of a counter electromotive force does require, however, that a generous voltage be delivered to the rectifier either by a large winding on the output coil or by a separate amplifier. Since an amplifier is often desirable in the interest of power output and to make the frequency independent of the load, as in the case of a buffer amplifier, it will be used here.

Figure 10:
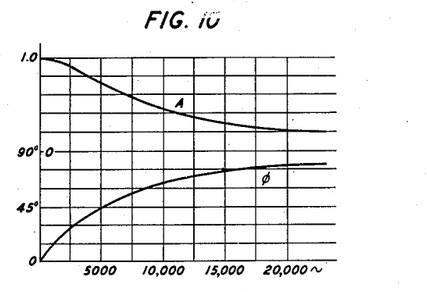
Fig. 10 is a diagram disclosing the transmission characteristics of a tuned circuit preliminarily to the use of these characteristics in a study of the circuit of the next figure.

Assume, to be specific, that the frequency is to be one megacycle and that the effective Q of the coil is 100. The transmission of the modulated wave in terms of the modulation frequency through a tuned circuit as in the oscillator of Fig. 9, is shown in Fig. 10, which is similar in effect to Fig. 4 although specific to a different set of electrical values and somewhat differently organized. It is noted that the phase shift at about 1000 cycles is about 10 degrees, the attenuation at this point substantially zero. Since this is, for our purpose, a very slow cut-off, we may design our gain adjuster to cut off more rapidly and, provided we achieve a proper coordination of the two, we may realize an adequate margin.

Figure 11:
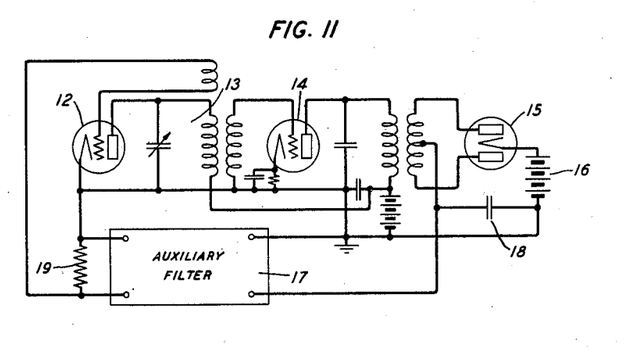
Fig. 11 discloses diagrammatically a circuit of the invention teaching the applicability of the analysis covered by the earlier numbered figures to the stability control of a given oscillator which is itself old in the art.

The circuit features already arrived at are shown in Fig. 11. The circuit comprises the oscillator 12 with a single tuned circuit 13, a buffer amplifier 14, having little selectivity and therefore contributing only a little to the equivalent filter section, a balanced rectifier 15 with a source 16 of biasing electromotive force and an auxiliary low-pass filter section 17. The analogy to the prototype circuit of Fig. 9 is obvious. Since it will be found, when the auxiliary filter is later described, that it contains direct connections between the upper and lower pairs of terminals, respectively, the capacitance 18 and resistance 19 somewhat closely simulate in function the capacitance $c$ and resistance $r$ of Fig. 9, to which are superadded the circuits within the block and which will be discussed presently. Said capacitance 18 is only large enough to allow the rectifier to be driven without too much loss from the oscillation frequency. It produces negligible effect at frequencies below 50 kilocycles.

Figure 12:
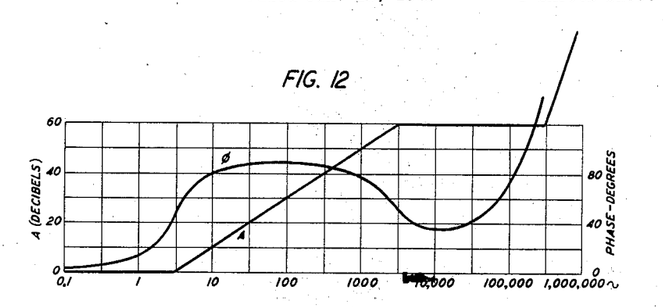
Fig. 12 comprises a diagram teaching the transmission characteristics of the auxiliary filter shown in block in said Fig. 11.

Let it be supposed that the buffer amplifier, rectifier, etc. have been so chosen that a zero-frequency modulation of one part to a million applied at the plate terminal will result in one thousand parts per million returned to that point. This is equivalent to 60 decibels feedback. It is proposed that the auxiliary low-pass filter be given approximately the characteristic shown in Fig. 12. This curve is plotted between frequency on a logarithmic scale and attenuation in decibels. No attenuation at frequencies below 3 cycles per second is called for so that the circuit may not be sluggish. Between 3 and 3000 cycles per second the loss rises linearly to 60 db. (60 decibels), a voltage ratio of 1000 to 1. A loss which is proportional to frequency in this fashion is readily achieved by driving a condenser from a suitable resistor and specifically by using a resistance and capacitance in series with a frequency high enough that the impedance on account of the capacitance is negligible in proportion to the circuit of the resistance. Fig. 12 shows that a phase angle of approximately 90° is associated with such an attenuation. In the frequency region from 3 to 300 kilocycles the loss is held flat at 60 decibels. This is desirable in that it, in the particular network used, and illustrated by Fig. 13, causes the phase angle to drop back toward zero. Moreover the modulation picked up in the feedback coil is exactly annulled by the modulation resulting from this amount of transmission. Over this band therefore $\mu\beta$ is closely zero and no trouble may result. Actually the tuned circuit brings in its loss and phase in this interval (Fig. 10). Since, however, the sum of the two phase curves is nowhere as large as 180° (which, of course, it would have to be to give an overall 0 phase shift) until the attenuation is very high, there is considerable margin against looping the point 1,0. In practice any loss between 55 and 75 decibels for this flat portion of the loss characteristic is quite safe since the balance pointed out is not critical.

Figure 13:
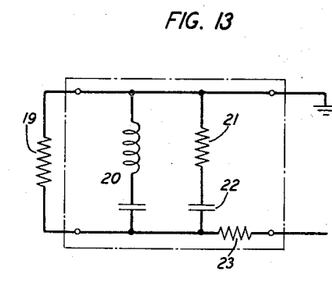
Fig. 13 shows the continuity of the circuit of said auxiliary filter contemplated by Fig. 12.

Elements which will give approximately the characteristics indicated are shown in Fig. 13 which discloses the circuit included in the auxiliary filter 17 of Fig. 11 and in which the resistance of resistor 21 is assumed for the practical case used to be 100 ohms and the capacitance of condenser 22 is assumed to be ½ microfarad. The shunt circuit 20 is tuned to the one megacycle frequency assumed. Otherwise, it is non-critical. In the practical case the resistance of resistor 19 was 200,000 ohms and that of resistor 23 was 100,000 ohms.

The operation of the filter circuit is outlined as follows: At zero frequency (dc) the shunt arms are ineffective and ⅔ of the applied voltage is delivered to resistor 19. At 3 cycles per second the reactance of condenser 22 is equal to 100,000 ohms and the attenuation is increased by the shunting effect of 22 on 19. At 100 cycles per second condenser 22 offers only 3,000 ohms and accordingly the attenuation as compared with the 3 cycles condition is about 100/3 or about 30 decibels. At 3,000 cycles per second this element 22 offers 100 ohms reactance, equal to the resistance of element 21 and the attenuation is about 1000/1 or 60 decibels. At higher frequencies resistor 21 controls and the loss due to this arm does not change. At a frequency of one megacycle the operating frequency arm 20 is resonant and offers a very low impedance. Accordingly, the loss at this frequency is very high. Moreover, the impedance seen by resistor 19 is low so that the currents induced in the feedback coil coupled to the coil of tuned circuit 13 are fully delivered to the grid of the tube. It will be evident that the network of Fig. 13 and its operation carry out the teachings of Fig. 12.

The over-all envelope $\mu\beta$ will now be considered further on the basis that the loop has been opened at the plate terminal of the tube. A low frequency modulation is returned unaffected to the grid by the feedback coil. However, the buffer amplifier, rectifier and auxiliary filter return a bias such that the plate current, into a suitable impedance, show a reversal of modulation and about 60 decibels increase. At 1000 cycles the tuned circuit (filter) still is producing very little effect as shown in Fig. 10. However, the auxiliary filter is producing about 50 decibels loss and 80° phase shift (Fig. 12). Therefore, the envelope is transmitted with only 10 decibels gain and about 80° phase shift. At 10,000 cycles the tuned circuit produces about 60° phase shift and 6 decibels loss and the auxiliary filter 60 decibels loss and 40° phase shift. Thus, the envelope is attenuated by 6 decibels and the phase shift is only 100°.

It may be seen that the magnitude of envelope $\mu\beta$ is below 1 for all frequencies above about 3,000 cycles (gain crossing) and that the phase is nowhere more than 100° until frequencies above 100,000 are reached. In terms of feedback the phase margin is 80° (180°−100°) and the gain margin, as defined by Fig. 10 for about 100,000 cycles is at least 20 decibels. These are regarded as generous margins.

Clearly the characteristic of Fig. 12 given by the network of Fig. 13 is a direct outcome of the system of analysis here taught. The slow and controlled cut-off is in marked distinction to general practice which calls for steep cut-off starting at a very low frequency.

Figure 14:
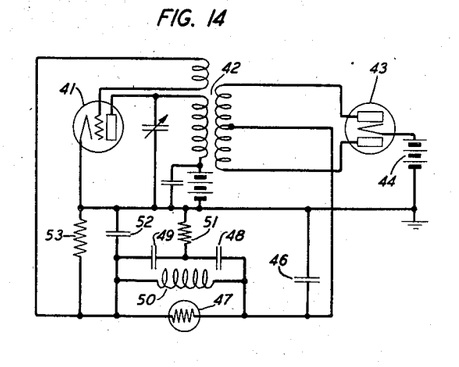
Fig. 14 illustrates another exemplification of the basic analysis in a circuit capable of generating a self-modulated wave; and, Fig. 15 illustrates a circuit, comparable with that of Fig. 11, but illustrating the applicability of the basic analysis to the stability control of a thermal limiter type of oscillator.

Just as an oscillator might be approached by the study of unstable amplifiers, it is possible to think of self-modulating oscillators as unstable oscillators. Although this instability has been treated as undesirable and circuits have been disclosed for preventing it, it is practicable to promote such instability and therefore to achieve a self-modulating oscillator where the modulation is regular and systematic. Fig. 14 discloses an oscillator of this type.

If a circuit is to function well as an oscillator, the high frequency simple $\mu\beta$ path at low levels must enclose the (1,0) point with considerable margin. When the level is raised so that the $\mu\beta$ curve goes through that point, it is necessary that the phase in that region change rapidly with respect to frequency if stability is to be good.

In the case of the self-modulating oscillator a number of requirements must be met simultaneously. At a very low level, as for instance, during the starting interval, the direct $\mu\beta$ loop must enclose 1,0 with adequate margin and as the (unmodulated) level is raised to the operating condition at the frequency of zero phase the net gain must reduce to zero in such a way that a small change of level results in a considerable change of gain and so that a small change of frequency results in a large change of phase. Conversely a given change of gain results in a small change of level and a given change of phase results in a small change of requency.

Now assuming the high frequency adjusted to the frequency and level that gives direct $\mu\beta$ equal to (1,0) it is necessary that an assumed modulation envelope shall meet the same conditions. That is, the low level envelope $\mu\beta$ shall loop (1,0) and when the modulation level is raised $\mu\beta$ shall equal (1,0).

The circuit of Fig. 14 satisfies the requirement. It is apparent that it is quite similar to the circuit of Fig. 9 but has a more complicated low frequency path, that is the path corresponding to the gain adjuster path of Fig. 9.

As in the circuit of Figs. 9 and 11, the circuit comprises an oscillator proper comprising tube 41, here shown diagrammatically but which might in practice well be a pentode tube with high interval impedance, with an additional feedback loop comprising a rectifier, in this instance a balanced or double wave rectifier 43 as in Fig. 11 and a circuit corresponding in position to the auxiliary filter of Fig. 11 comprising limiter 47, inductance 50, resistance 51 and capacitances 48, 49 and 52, to receive the rectified wave, condition it, and impress it as a variable bias or modulation on the control grid or electrode of the oscillator.

Resistance 53 and capacitance 46 are positioned like resistance 19 and capacitance 18 of Fig. 11 and have analogous functions. Principal attention will be given to the portion of the circuit included between the rectifier and the input electrodes of the oscillator and therefore between and including the capacitances 46 and 52.

The operation of the circuit of Fig. 14 will be explained on the basis of the analysis taught in the previous pages. The circuit will be thought of as opened at the plate of tube 41. Now a test such as that shown in Fig. 3 will be considered. A generator having high internal impedance (like the tube) and a detector having the same impedance as the tuned coil are appropriate.

First an unmodulated wave of low level and variable frequency will be considered. The voltage applied to the double wave rectifier (43) is too low to overcome the battery 44 and therefore no bias is developed across resistor 53. Accordingly, the tube gain is high. The transmission to this wave, referred to as the direct $\mu\beta$, encloses the point 1,0 and in the region of zero phase the phase shift changes rapidly with respect to frequency because of the tuned coil. These conditions are essentially those existing in any tuned plate feedback oscillator.

The direct $\mu\beta$ is not affected as the level out of the test generator is raised until it reaches the value for which rectifier 43 begins to operate. A relatively small increase in the level above this point increases the bias and reduces the gain to the extent that $\mu\beta$ passes through (1,0).

Evidently the system is capable of oscillating at the frequency and level for which $\mu\beta=1$. The test generator may now be thought of as operating at this condition while low level modulation is applied.

A very low frequency modulation will be returned magnified and reversed as in the circuit of Fig. 11 because inductance 50 passes low frequencies and direct current without loss. As the frequency of modulation is raised the elements of the auxiliary filters 48, 49, 50 and 51 insert phase and attenuation to the wave demodulated by rectifier 43 so that the envelope is attenuated and shifted in phase. The element 47 is a thermistor whose resistance is high for low currents and low for high currents. Elements 46 and 52 are bypass capacitances which pass the high frequency wave with little impedance but do not pass the desired modulation frequency.

It may be shown that the auxiliary filter shifts from 0 to 270° phase in going from low to high frequencies and that the loss at low levels is nowhere high. Accordingly, the envelope $\mu\beta$ for small modulation loops 1,0. As the modulation of the test generator is raised the thermistor (47) heats. This affects the transmission of the auxiliary filter most in the region of 180° phase, the frequency at which self-modulation will occur. The result is to collapse the size of the envelope $\mu\beta$ plot so that it passes through (1,0).

From the above it is clear that a sinusoidal wave with sinusoidal modulation will be generated by this circuit. The amplitude of the high frequency wave depends primarily upon the battery 44 and the feedback winding of transformer 42, the frequency upon the timing of the plate coil, the amplitude of the modulation upon the properties of the thermistor 47 and of the tube 41 and the modulation frequency upon the values 48, 49, 50.

Figure 15:
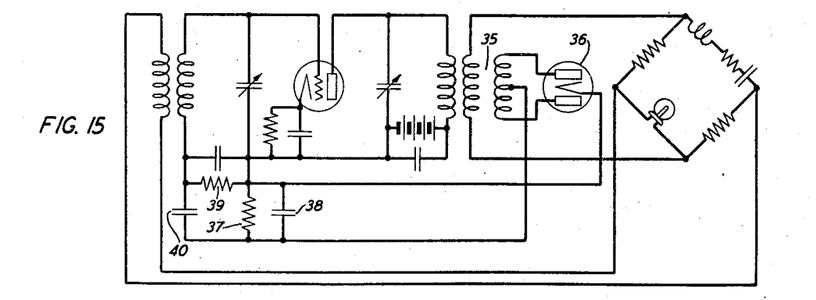

When oscillators involving thermal limiters, as in the instance of the Fig. 1 circuit, are in trouble from low frequency interruptions or the like, that is when they are affected by the phenomena treated in this specification, it is sometimes possible to remedy the condition by application of bias control. Obviously the direct current bias, that is the bias with respect to the high frequency, must not be changed or the limiter would not be able to function properly, to stabilize at that frequency. However, low frequencies may be returned through a blocking condenser in such a way as to alter the modulation $\mu\beta$ characteristic and thereby promote stability. This is analogous to adding, in the $\mu\beta$ path of an amplifier, elements which produce negligible effects in the band but promote phase margin in the region of the gain crossing. Fig. 15 discloses such a circuit.

Except for the novel bias control feature, the circuit of Fig. 15 is a standard Meacham oscillator as disclosed in his Patent 2,163,403, June 20, 1939. A physical resonant circuit is indicated, which, however, may be replaced by a crystal, if desired. The circuit to which the bias control feature of the invention is applied is quite similar to Fig. 1 also, the differences being obvious. The bias control feature has some resemblance to the nearest corresponding feature of the Figs. 11 and 14 circuits. For simplicity, in view of the prior disclosure and the disclosure of the Meacham patent, the description here will be confined to this bias control feature.

Transformer 35 enables a desired amount of output current to be abstracted from the oscillator and rectified in balanced or double-wave rectifier 36, the resultant potential being impressed across the resistance 37. The capacitance 38 insures that the potential across said resistance is steady, the double-wave rectifier promoting this result although a single wave rectifier would give comparable results. This steady state condition, however, is predicated on a steady state oscillation, that is the generation of a wave without modulation. For this condition there can be no current flow through the shunting circuit comprising resistance 39 and capacitance 40 so that no potential exists across resistance 39. Accordingly, a potential equal to that across resistance 37 exists across capacitance 40. If, however, the amplitude of oscillation is changing as because of the incidence of a modulation condition, then capacitance 40 must charge and discharge through resistance 39. This increases or decreases the bias and therefore correspondingly affects the gain of the tube. This effect is enhanced if the tube is of the variable $\mu$ type, which can easily be realized in practice. The connections, as by the poling of the rectifier relatively to the network to which it is connected, should be such that an increasing level decreases the gain and vice versa. This all means that by the expedient of the invention, the carrier, that is the desired wave, is generated in a conventional manner without being affected by the superposed gain control circuit but that, because of the gain control circuit there is a volume control affecting the envelope only and insuring that no envelope is generated.

The fact of stability of the circuit can be established by opening the oscillating loop, say at the terminals of the input transformer, and inserting a generator and a detector as for a $\mu\beta$ measurement, and according to the early analysis in this specification. A wave of the desired frequency and level is inserted and, when properly chosen, returns unchanged in amplitude and phase. A small low-frequency modulation frequency is now added. If the invention is to be effective the low frequency envelope must not be returned in phase with that supplied unless at a loss of amplitude. Without the added elements of the gain control, it would be found that this criterion cannot be satisfied. With the loss produced by the added elements stability is assured.

While the invention has been described in connection with particular embodiments, certain variations have been suggested and it is to be understood that many additional changes are possible within the scope of the invention.

What is claimed is:

1. A stable frequency, pure wave, oscillator comprising an amplifier device having input and output electrodes including a common electrode, a feedback path including a frequency determining means coupling the input and output circuits of said device, and an auxiliary feedback path, at least in part independent of said first-mentioned feedback path and likewise coupling the output and input circuits of the device, said auxiliary feedback path comprising means for deriving a portion of the output wave of said device and for electrically conditioning the resultant wave and impressing it as a bias pontential on the input electrodes of said device, said conditioning means comprising a filter network having a substantially linear and slow attenuation-frequency characteristic through substantially a given frequency range of threatened envelope potential and a substantially constant attenuation thence up to the characteristic frequency as determined by said frequency determining means so that the polar frequency envelope transmission diagram for the $\mu\beta$ path with respect to said envelope potentials over a substantial frequency range does not enclose the (1,0) point.

2. The organization specified in claim 1 in which said conditioning means includes additionally a buffer amplifier and a double wave rectifier in serial energy flow relation with each other and with said filter network.

3. The organization specified in claim 1 in which said conditioning means includes an amplifier, rectifier and an amplitude and phase regulating network all in serial energy flow relation, said network comprising, in parallel relation, a circuit series resonant at the desired oscillation frequency and a series combination of a resistance and a capacitance, said capacitance being such that, for a given range of envelope frequency, its impedance is negligible in proportion to said resistance.

4. The organization recited in claim 1 in which said conditioning means includes an amplifier, rectifier and amplitude and phase regulating network all in serial energy flow relation, said last three elements being so chosen that a zero-frequency modulation of one part per million applied at the output terminals of said device will result in one thousand parts per million returned to that point, and said network comprising in parallel relation a reactive circuit which is series resonant at the desired oscillation frequency and a series combination of a resistance and a capacitance, said resistance being approximately 100 ohms and the capacitance being approximately $15 \times 10^2$ micro-microfarads, said oscillation frequency being of the order of 1 megacycle.

WILLIAM A. EDSON.